United States Patent
King et al.

(10) Patent No.: US 7,484,300 B2
(45) Date of Patent: Feb. 3, 2009

(54) EXTENSIBLE POLE SAW HAVING SEPARABLE SECTIONS

(75) Inventors: Wade C. King, Columbia, MD (US); Wallis Alsruhe, Manchester, MD (US); Timothy W. French, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/937,622

(22) Filed: Sep. 9, 2004

(65) Prior Publication Data

US 2006/0048397 A1 Mar. 9, 2006

(51) Int. Cl.
B23D 57/02 (2006.01)
B26B 27/00 (2006.01)

(52) U.S. Cl. .................. 30/296.1; 30/166.3; 30/381

(58) Field of Classification Search ........... 30/296.1, 30/166.3, 381; 439/680, 678, 677, 135; 56/12.7
See application file for complete search history.

(56) References Cited

U.S. PATENT DOCUMENTS

| | | | |
|---|---|---|---|
| 2,586,145 A | 2/1952 | Breuer et al. | |
| 2,969,559 A | 1/1961 | Landis | |
| 3,731,380 A | 5/1973 | Mathiesen | |
| 3,952,239 A | 4/1976 | Owings et al. | |
| 4,052,789 A | 10/1977 | Ballas, Sr. | |
| 4,089,114 A | 5/1978 | Doolittle et al. | |
| 4,236,310 A | 12/1980 | Muller | |
| 4,237,610 A | 12/1980 | Bradus et al. | |
| 4,269,571 A | 5/1981 | Shikutani et al. | |
| 4,413,371 A | 11/1983 | Tuggle et al. | |
| 4,463,498 A | 8/1984 | Everts | |
| 4,536,914 A | 8/1985 | Levine | |
| 4,542,557 A | 9/1985 | Levine | |
| 4,654,971 A | 4/1987 | Fettes et al. | |
| 4,759,730 A * | 7/1988 | Sappington et al. | ...... 439/620.3 |
| 4,829,675 A | 5/1989 | Beihoffer | |
| 5,181,369 A | 1/1993 | Everts | |

(Continued)

FOREIGN PATENT DOCUMENTS

DE     311 85 57 C2 *  7/1974

(Continued)

OTHER PUBLICATIONS

Parmley, R.O. (2000). Illustrated Sourcebook of Mechanical Components. McGraw-Hill. Chapter 4, 4-38, 4-39.*

(Continued)

Primary Examiner—Kenneth E. Peterson
Assistant Examiner—Sean Michalski
(74) Attorney, Agent, or Firm—John Yun; Bruce S. Shapiro; Wesley Muller (57) ABSTRACT

An elongated pole pruner for cutting and trimming trees, bushes and the like having three separable sections, that when assembled, form an extended length pruner. The pole pruner includes a first section containing a handle and battery pack, a second extension section, and a third section that contains the purner itself. Each of the sections contains an electrical conductor that is attached to corresponding conductor in an adjacent pole sections via a male plug and female receptacle. In this way, the battery pack in the first section of the pole is able to deliver power through the second section to the pruner in the third section.

9 Claims, 11 Drawing Sheets

U.S. PATENT DOCUMENTS

| | | | |
|---|---|---|---|
| 5,594,990 A | | 1/1997 | Brant et al. |
| 5,718,050 A | | 2/1998 | Keller et al. |
| 5,722,111 A | | 3/1998 | Sowell et al. |
| 5,809,653 A | | 9/1998 | Everts et al. |
| 5,926,961 A | | 7/1999 | Uhl |
| 5,961,207 A | * | 10/1999 | Petkovic ..................... 362/376 |
| D453,921 S | * | 2/2002 | Bussett et al. .............. D13/133 |
| 6,592,392 B2 | * | 7/2003 | Po-Heng ..................... 439/358 |
| 2006/0094302 A1 | * | 5/2006 | Lord .......................... 439/680 |
| 2008/0196256 A1 | * | 8/2008 | Gieske et al. .............. 30/277.4 |

FOREIGN PATENT DOCUMENTS

| | | | |
|---|---|---|---|
| DE | 7425295 | | 7/1974 |
| DE | 3118557 C2 | | 6/1982 |
| DE | 295 08 203 U1 | * | 5/1995 |
| DE | 295 03 837 U1 | | 8/1995 |
| DE | 295 08 203 U1 | | 9/1995 |
| DE | 298 10 450 U1 | | 10/1998 |
| EP | 0 666 019 B1 | | 6/2001 |
| EP | 1 260 134 A2 | | 11/2002 |
| EP | 0 822 036 B1 | | 5/2003 |
| EP | 1 397 955 A2 | | 3/2004 |
| EP | 1 400 317 A1 | | 3/2004 |
| FR | 2 482 698 | | 11/1981 |
| GB | 2 233 599 A | | 1/1991 |

OTHER PUBLICATIONS

Magrab, Edward. (1997)Integrated Product and Process Design and Development. CRC Press. Chapter7. 141, 144.*

Putnam. "Putnam Plug In Wiring Kits". trailersnhitches.com/putnamcart/61305.html. At least as early as 1987. Viewed Sep. 18, 2006.*

"NPSE Code of Ethics for Engineers" from www.npse.org/ethics/eh1-code.asp retrieved Dec. 31, 2007. First printed page only.*

"Criteria for accrediting Engineering Programs". ABET. Mar. 17th 2007. pp. i, ii 1 and 2.*

Magrab, Edward . "Integrated Product and Process Design and Development". CRC Press. Boca Raton. © 1997. pp. 245, 246, 144, 249.*

Beggs, Joseph Stiles. "Mechanism". McGraw Hill © 1955. pp. 350-351.*

The Green Machine, High Performance Yard-Care Tools; String-Trimmer/Brush-Cutter Model 2340: Long Beach, CA.

* cited by examiner

EXTENSIBLE POLE SAW HAVING SEPARABLE SECTIONS

BACKGROUND OF INVENTION

Power tools, such as saws, trimmers and pruners have been used for some time to cut and shape trees and bushes. To increase their versatility, these tools have been placed on the end of poles so that elevated sections of trees or bushes can be reached for cutting without having to use a ladder or other similar device. In many cases, the power tool is simply placed on the end of a long single pole to provide the necessary extension. However, the typical length of an extension pole makes it is difficult to transport and store. Furthermore, placing the entire power tool at the end of an extension pole makes it difficult to balance, and extremely unwieldy because all of the weight is at the end of the pole.

Manufacturers have attempted to overcome the burdensome pole length by using a telescopic pole that can be compressed into a smaller space. However, telescoping poles have a decreasing diameter along their length, thus providing a structurally weaker pole at the narrower sections. This increases the likelihood that the pole will break and creates a safety hazard for the user.

Furthermore, manufacturers have attempted to solve the uneven weight distribution of the power tool by distributing weight at both ends of the pole. This has been done by placing the power tool portion at one end, and the power source portion (i.e. gas tank, battery, etc.) at the other. However, this solution typically entails having a continuous mechanical drive train or an electrical conductor (i.e. wire) connecting the tool end and the power supply end. This continuous connection often cannot be separated or shortened in conjunction with a telescopic or separable pole.

Therefore, it would be advantageous to provide an extensible pole that can be separated into smaller components for easier transport and storage. It would be further advantageous to provide an extensible pole having uniform diameter and strength.

SUMMARY OF INVENTION

The present invention is directed to an elongated pole saw for cutting and trimming trees, bushes and the like. The saw comprises three detachable sections, that when assembled, form an extended length saw having a battery pack on one end, and a saw or other power tool at the other end. The pole saw includes a first section containing a handle and battery pack, a second extension section, and a third section that contains the saw itself. Each of the sections contains an electrical wire that is terminated at the ends of the pole sections and are attached to adjacent pole sections via a male plug and female receptacle. In this way, the battery pack in the first section of the pole is able to deliver power through the second section to the saw in the third section.

DETAILED DESCRIPTION OF THE PREFERRED EMBODIMENTS

Figure 1:
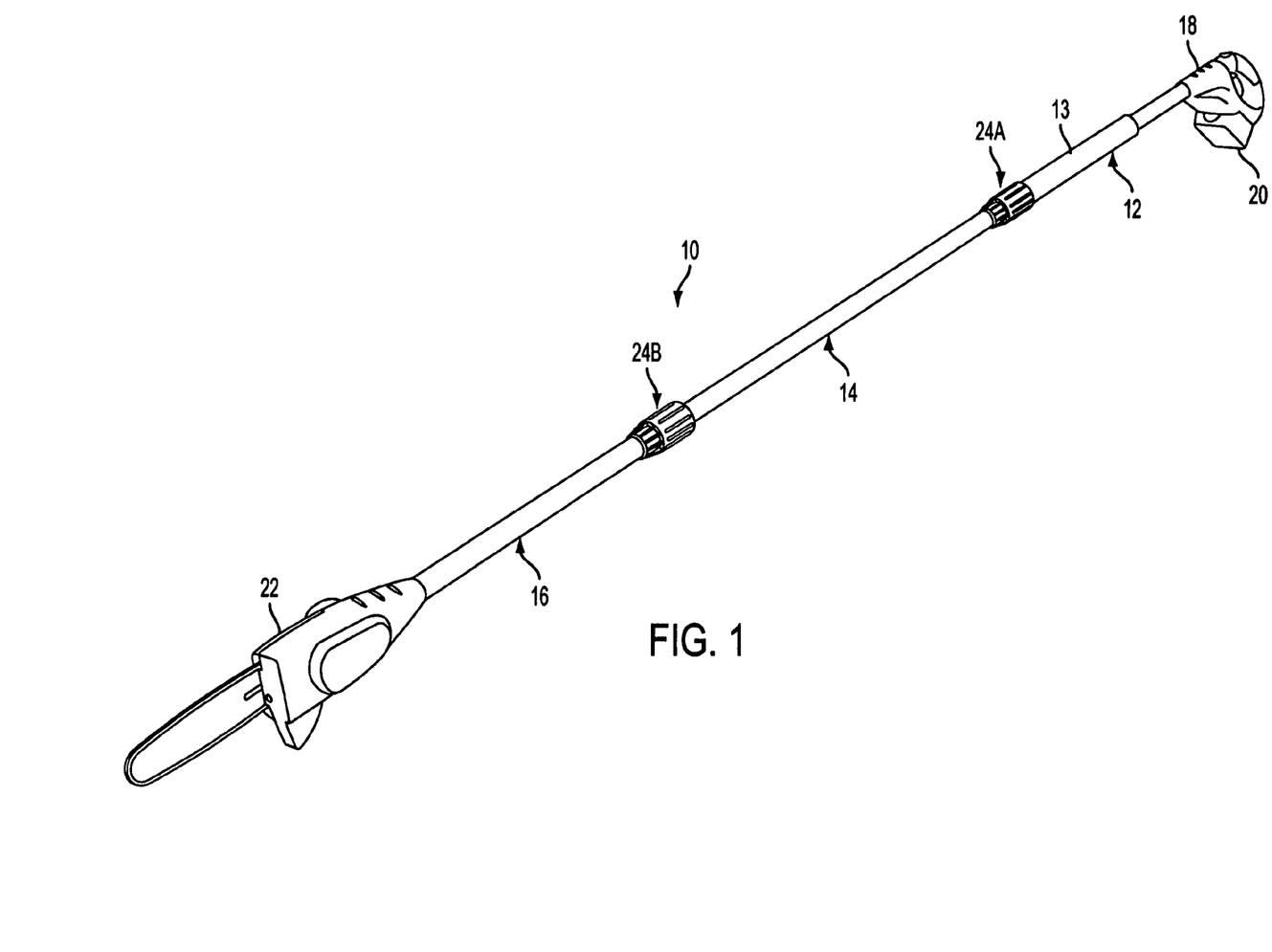
FIG. 1 shows an assembled pole pruner of the present invention.
Figure 2:
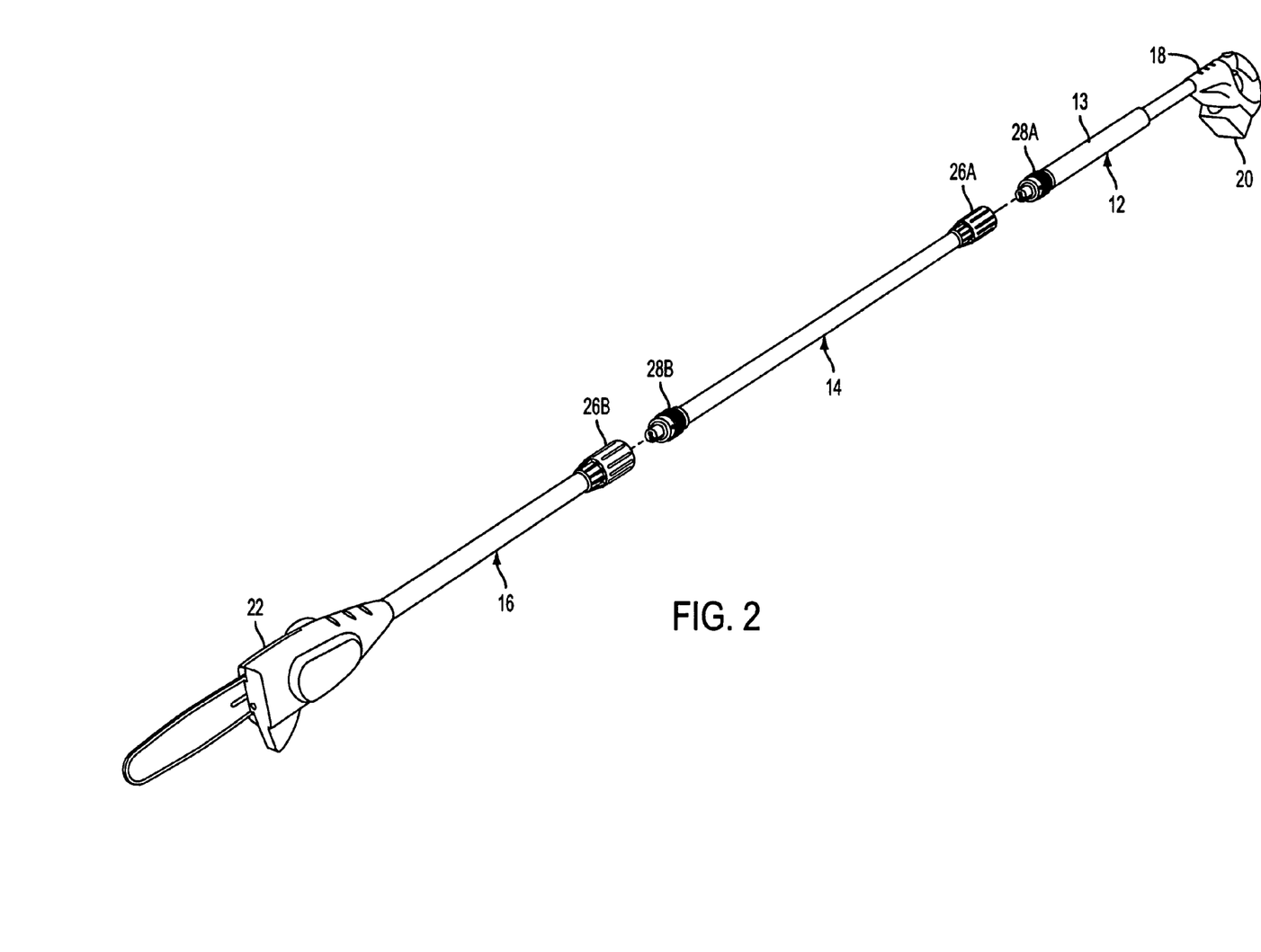
FIG. 2 shows a disassembled pole pruner of the present invention.

A pole saw 10 of the present invention is shown in FIGS. 1 and 2 in an assembled and disassembled state, respectively. The pole pruner 10 includes a first pole section 12, and second intermediate pole section 14, and a third pole section 16. The first pole section 12 includes a soft cushioning material 13 for comfortable gripping of the pole section 12, a handle 18, and a battery pack 20 for supplying power to a tool 22 at an end of the third pole section 16. The tool 22 is shown in the figures as a saw, but it is contemplated that any tool may be placed at the end of the third pole section 16, and the invention is not limited to a saw.

Each of the pole sections are detachably connected to one another to form a single elongated pole for reaching elevated branches and the like without the need of a ladder. This greatly increases the safety of using such a device because a user does not have to balance himself on a ladder while using the tool.

Figure 3:
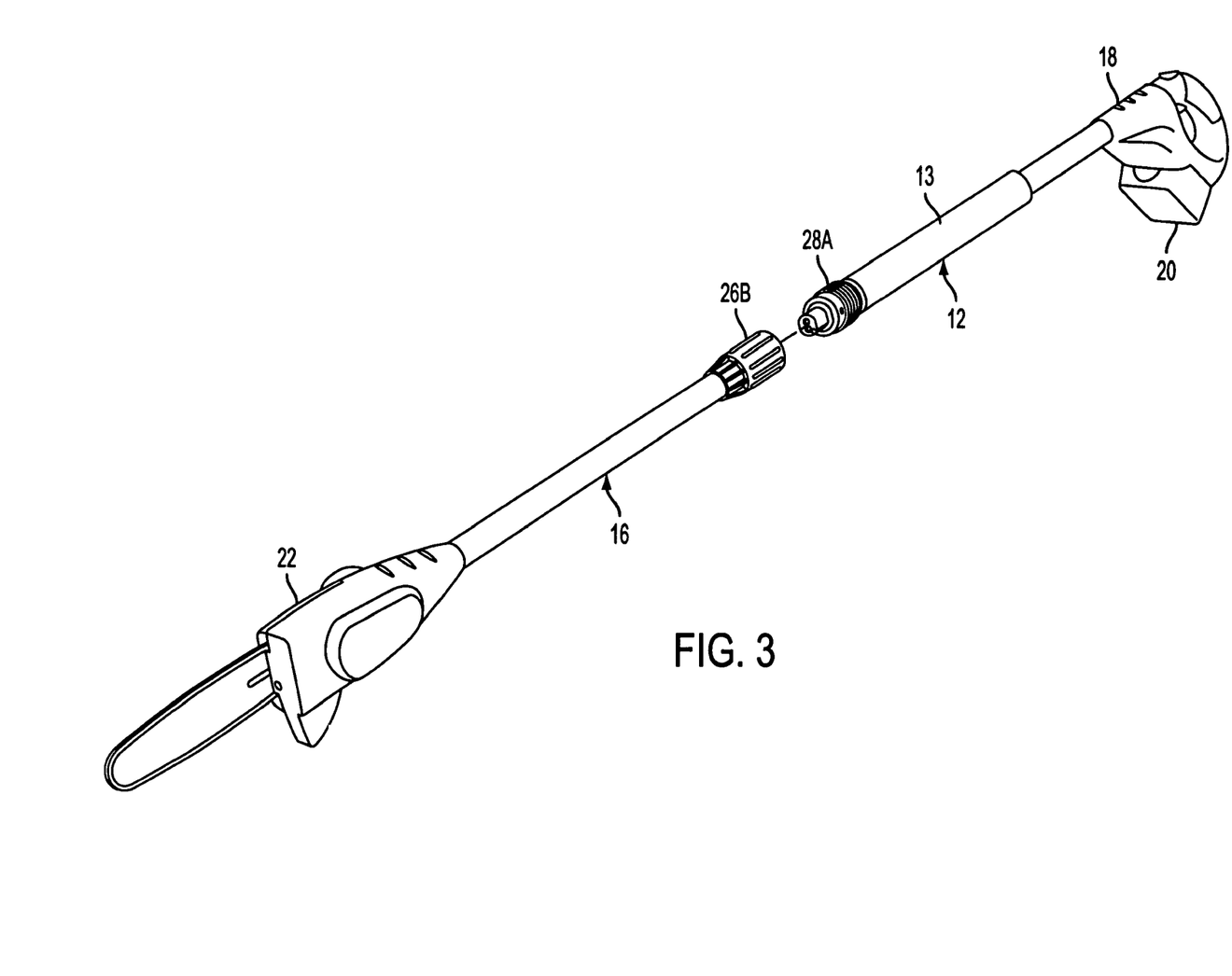
FIG. 3 shows a pole pruner of the present invention with an intermediate pole section removed.

The pole sections are connected at connecting sections 24A and 24B, which comprise female receptacles 26A and 26B and male plugs 28A and 28B on adjacent ends of each pole section, as best shown in FIG. 2. The arrangement shown in FIG. 2 allows the second pole section 14 to be removed so that the first pole section 12 can be directly connected to the third pole section 16, as shown in FIG. 3. The shortened pole arrangement may be useful when only a short reach is needed, and has the advantage of providing greater control over the pole saw 10. The preferred embodiment limits the number of pole sections to three, by using keying features on the male plugs 28A and 28B and female receptacles 26A and 26B, as described in greater detail below. The number of pole section is limited to prevent the pole length from becoming dangerously long. However, it should be understood that any number of pole sections may be used and still fall within the scope of the invention.

Figure 4A:
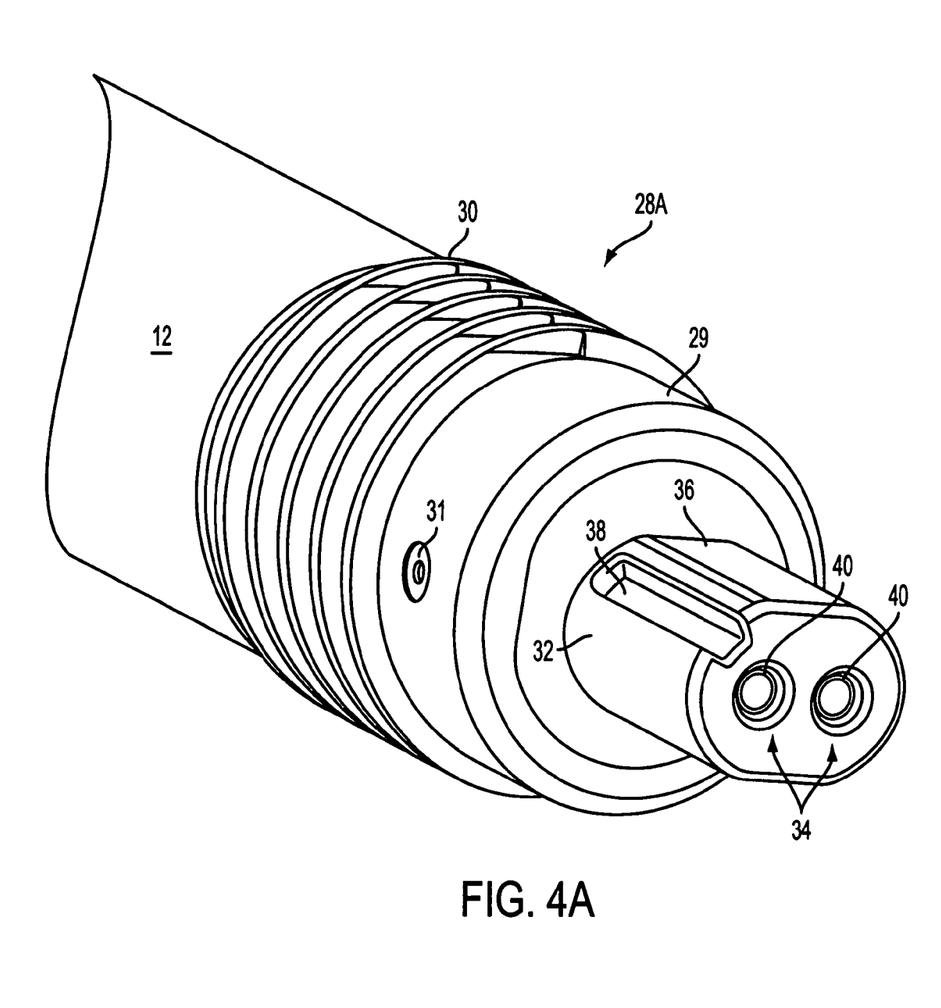
FIG. 4A shows a male plug of a pole section.
Figure 4B:
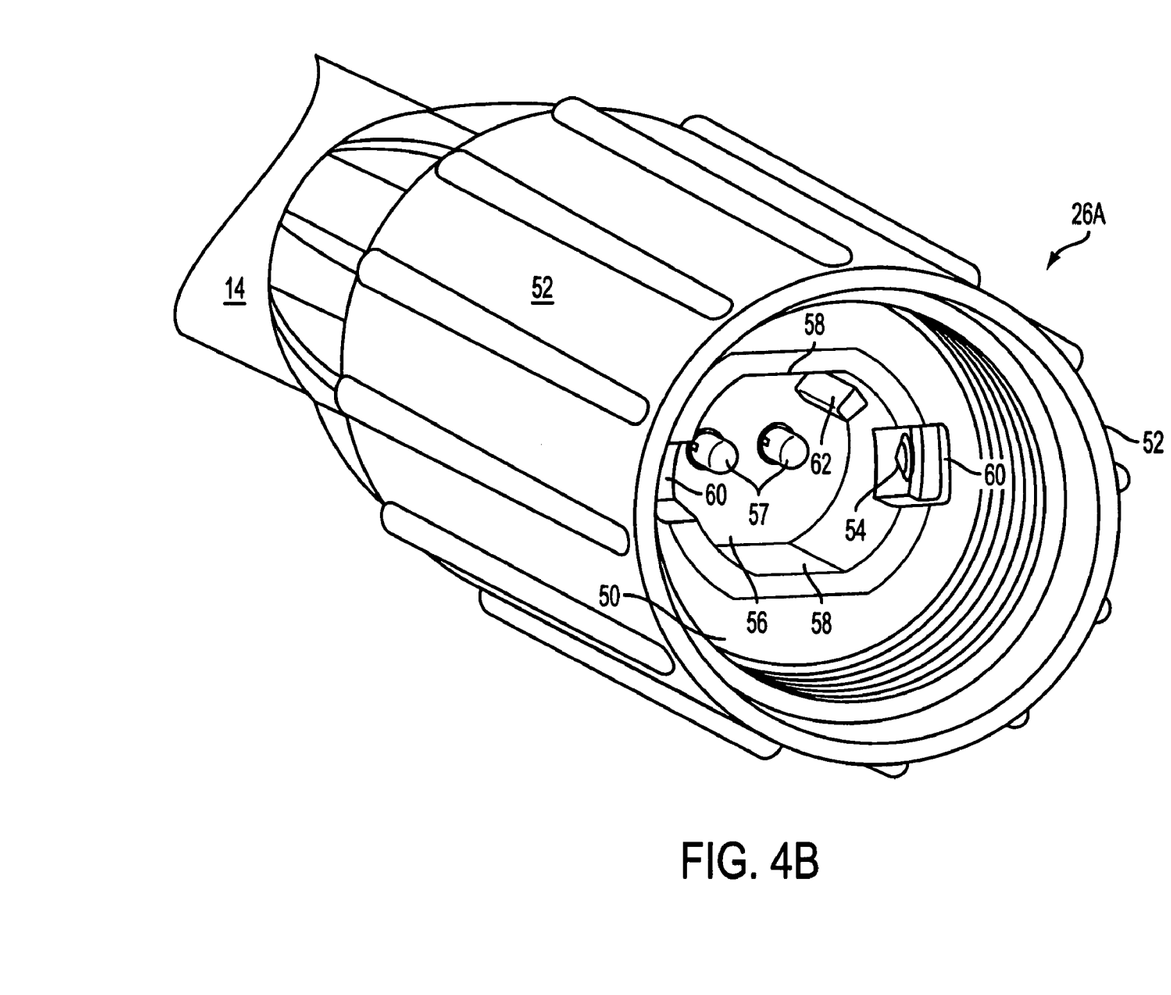
FIG. 4B shows a female receptacle of a pole section.
Figure 5A:
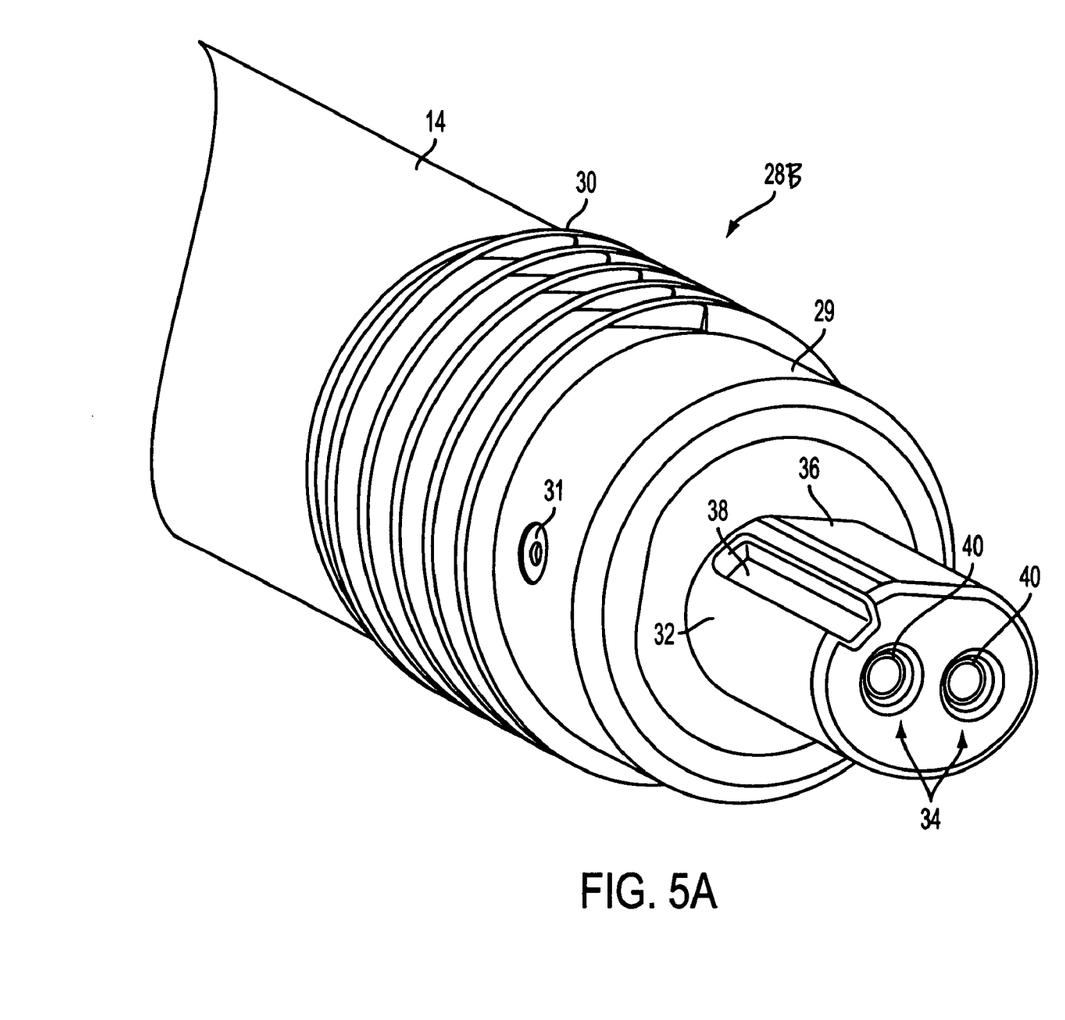
FIG. 5A shows a male plug of a second pole section.
Figure 5B:
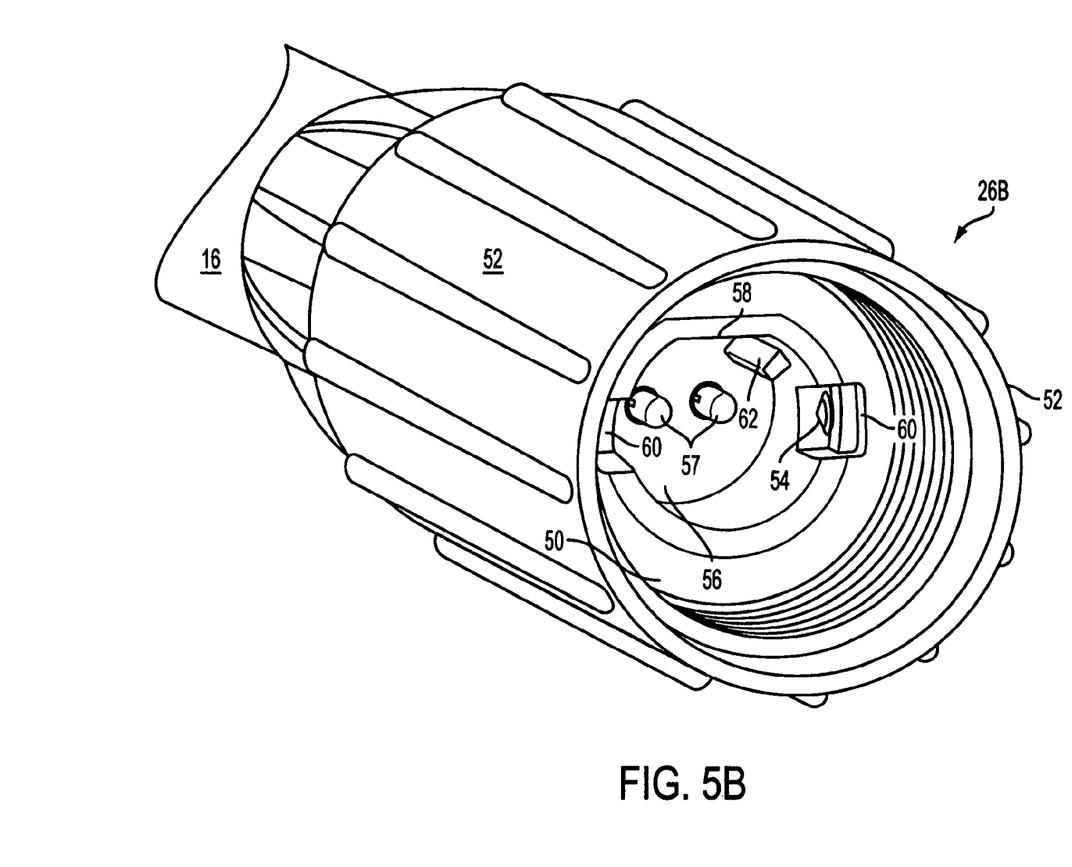
FIG. 5B shows a female receptacle of second pole section.

The connecting sections 24A and 24B will now be described in greater detail. FIGS. 4A and 4B show detailed views of the male plug 28A and female receptacle 26A connecting the first pole section 12 and the second pole section 14, and FIGS. 5A and 5B show the male plug 28B and female receptacle 26B for connecting second pole section 14 with the third pole section 16.

Figure 6A:
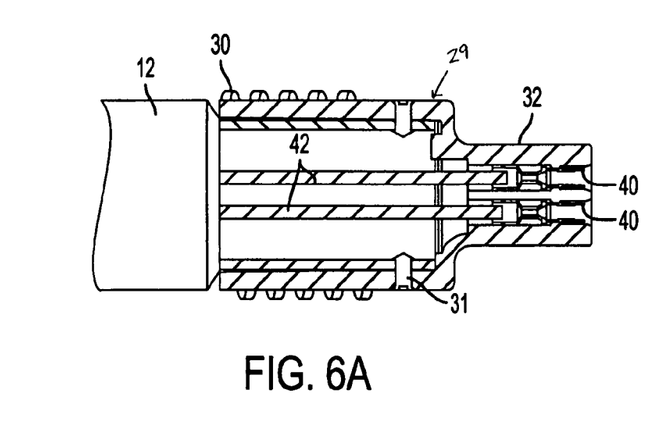
FIG. 6A shows a cut-away view of the male plug of FIG. 4A.

Referring now to FIG. 4A, the male plug 28A comprises a hollow male housing 29 that is fitted over an end of the pole section 12 and fixedly secured thereto by rivets 31 (see also FIG. 6A). Although, the male housing 29 is separate from the pole section 12 in the preferred embodiment, it is contemplated that the male housing 29 be made integral with the pole section 12. The male housing 29 shown in FIG. 4A includes threads 30 on its outside diameter and a front stem 32 extending therefrom. The stem 32 includes two openings 34, two flat surfaces 36 on opposite sides, and a slot 38 along its length.

The openings 34 hold two electrical contacts 40 that extend back through the stem 32 and connect to electrical wires 42 that run the length of the pole section (see FIG. 6A).

Figure 4C:
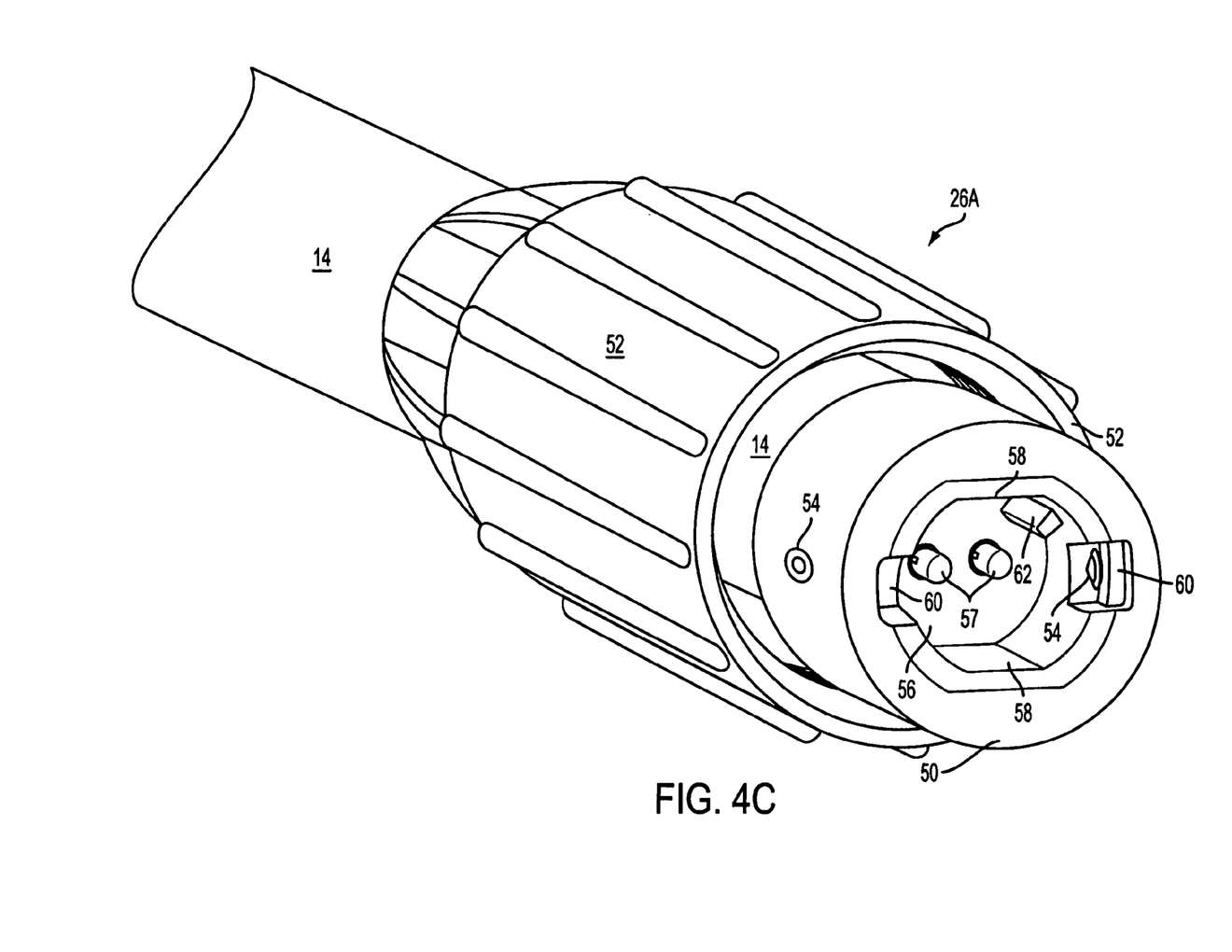
FIG. 4C shows the female receptacle of FIG. 4B with a sleeve pulled rearwardly.
Figure 6B:
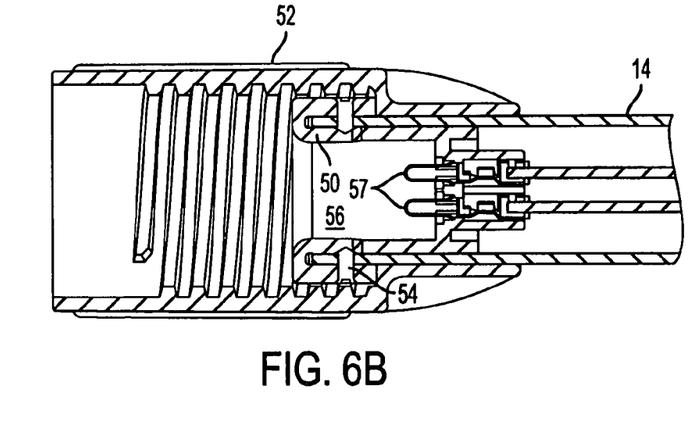
FIG. 6B shows a cut-away view of the female receptacle of FIG. 4B.

Referring now to FIGS. 4B and 4C, the female receptacle 26A includes a housing 50 and a threaded sleeve 52. FIG. 4C shows the female receptacle 26A of FIG. 4B with the threaded sleeve 52 pulled slightly rearwardly to better reveal the housing 50. The housing 50 is folded over an end of the pole section 14 and secured on opposite sides by rivets 54 (see also FIG. 6B). The housing 50 defines an opening 56 for receiving the stem 32 of the male plug 28A. A rear portion of the opening 56 includes two apertures through which contacts 57 protrude. The opening 56 is generally cylindrical-shaped having flattened portions 58 on opposite sides thereof to correspond to the shape of the stem 32. The opening 56 further includes cavities 60 for holding the rivets 54 (only one seen in figure) so that they do not interfere with the insertion of the stem 32 into the opening 56, and a protrusion 62 corresponding to the slot 38 on the stem 32.

When the stem 32 is inserted into the opening 56, the protrusion 62 slides into slot 38, and the contacts 40 engage corresponding contacts 57. The matching flat portions 36 and 58 on the stem 32 and in the opening 56, respectively, align the male plug 28A and female receptacle 26A and prevent their rotation relative to one another. The slot 38 and protrusion 62 further orients the relationship of the male plug and female receptacle for proper electrical connection.

The threaded sleeve 52 is slidably and rotatably attached to the pole 14 and is prevented from sliding forwardly off of the pole by the housing 50. The sleeve 52 is threaded on its interior so that when the male plug 28A is attached to the female receptacle 26A, the sleeve 52 is slid forwardly so that it overlies and engages the threads 30 of the male plug 28A.

FIGS. 5A and 5B show the male plug 28B and the female receptacle 26B for the second connecting section 24B, connecting the second pole section 14 to the third pole section 16. Similar elements in the male plug 28B and female receptacle 26B of the second connection section 24B to the first connecting section 24A are labeled with identical reference numbers. The difference in the second connection section 24B is that the stem 32 of the male plug has only a single flat surface 36, and similarly, the opening 56 in the female receptacle has only a single flat portion 58. The reason for this is explained below.

The single and double "flat portion" keying feature in the connecting sections 24A and 24B allows the pole saw 10 to use three pole sections, as shown in FIGS. 1 and 2, or two pole sections as shown in FIG. 3, but prevents the addition of a fourth pole section, ie. another intermediate pole section 14. The keying feature allows the male plug 28A (having two flat portions) of the first pole section 12 to be inserted into either the female receptacle 26A (having a two flat portion) or 26B (having a single flat portion) of the second or third pole sections 14 and 16. However, the keying feature prevents a user from adding an additional fourth intermediate pole section, like pole section 14, because the male plug 28B of the pole section 14 (which has a single flat portion) does not fit into the female receptacle 26A (which as two flat portions) of the similarly made pole section 14. Therefore, a user is prevented from using more than three pole sections and thereby increasing the length of the pole saw.

Figure 7A:
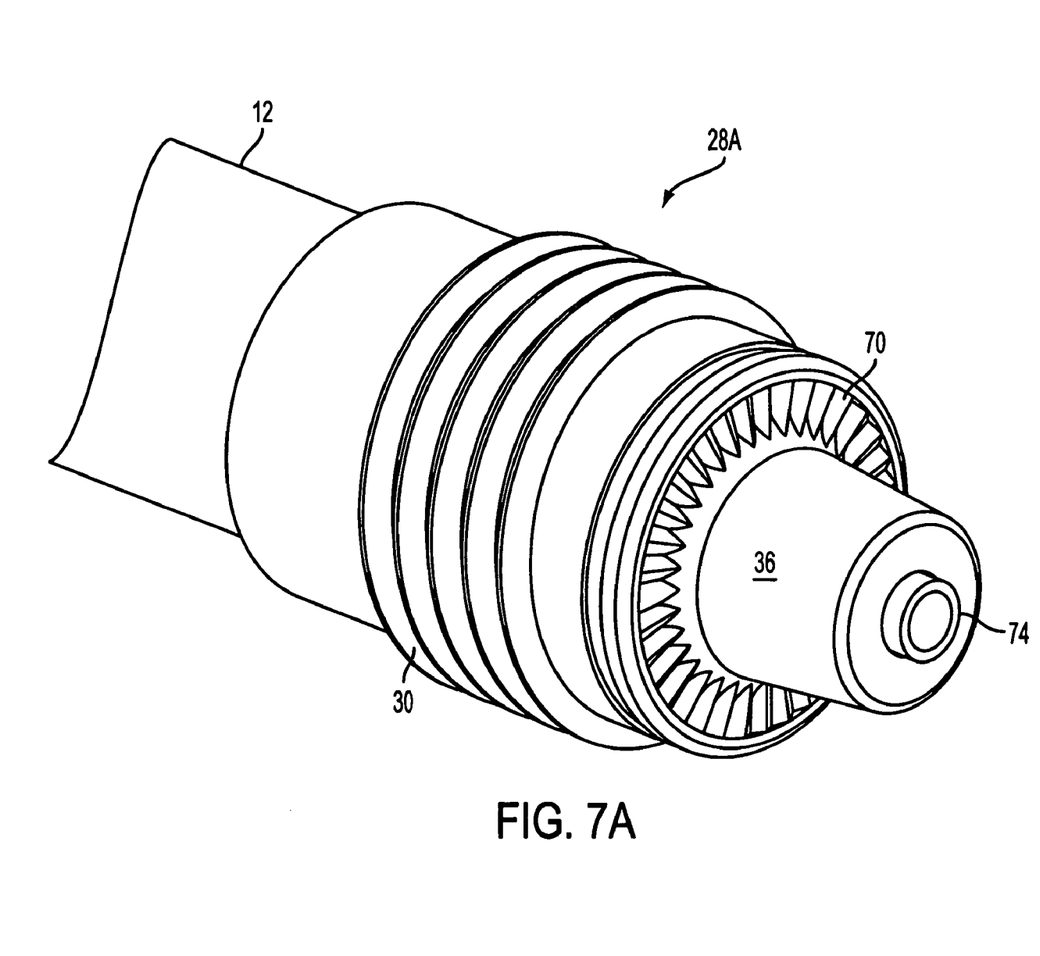
FIG. 7A shows the male plug of an alternative embodiment of the invention.
Figure 7B:
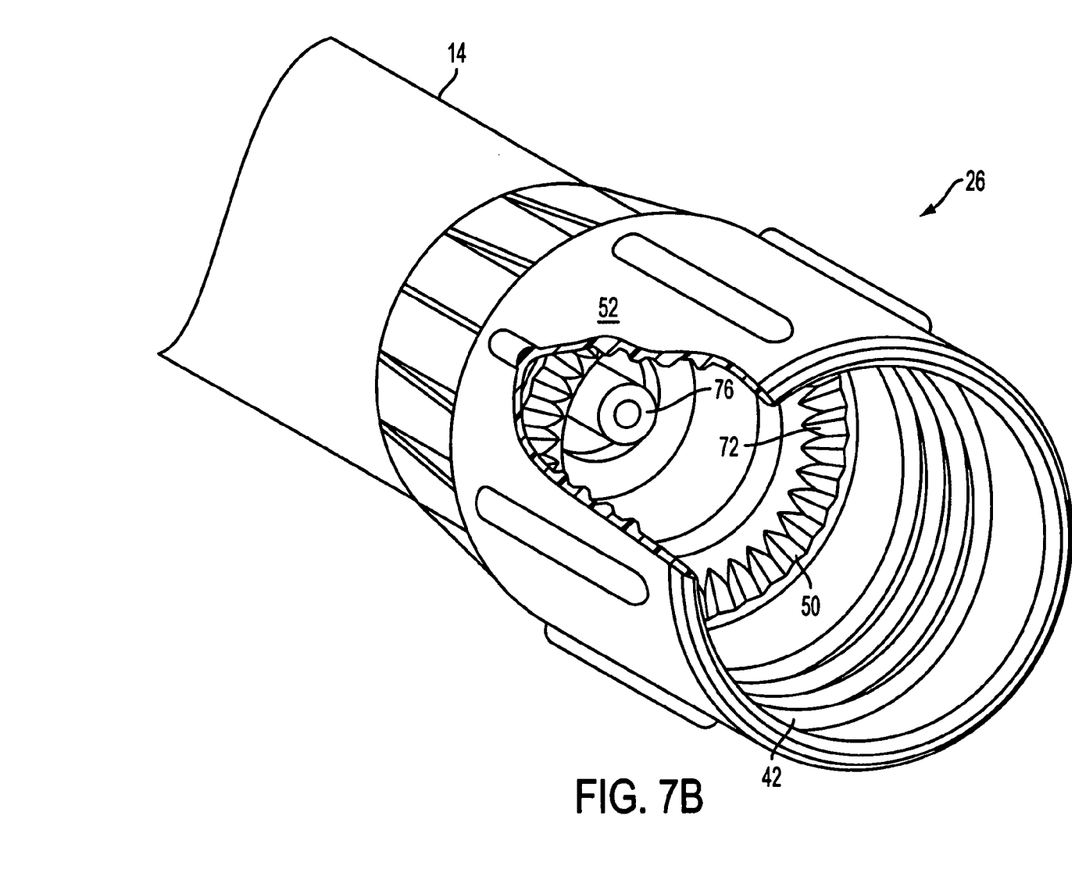
FIG. 7B shows a female receptacle of an alternative embodiment of the invention.

FIGS. 7A and 7B show an alternative embodiment of the present invention. Here, rather than using corresponding flat portions as a keying feature to prevent rotation, the male housing 28 includes a serrated front face 70 that engages a corresponding serrated face 72 on the female plug 26. Additionally, this embodiment of the invention uses a single contact 74 on the male plug and a single contact 76 on the female plug. In other respects, the alternative embodiment is identical to the preferred embodiment previously described.

The present invention provides the advantage of having detachable pole sections that can be separated into three shortened smaller sections, making it easier to package and transport. Also, unlike previous telescopic-type devices whose pole section diameters decrease along their length, the pole sections 12, 14 and 16 of the present invention have the same diameter and consequently, their rigidity and strength are consistent throughout its length. Furthermore, because the power source is at one end and the tool is at another, the weight of the device is divided making the product easier to handle.

Although a preferred embodiment has been disclosed, it should be noted that the description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A power tool device having an adjustable length, the power tool device comprising:

a plurality of pole sections, each having an electrical conductor therein for transferring electrical power, each pole section having at least one of a male stem or a female opening to mate with an adjacent one of a male stem or female opening;

wherein each corresponding male stem and female opening are non-rotatably attached at connecting sections to electrically connect the pole sections, a first and second connecting section including a keying feature to prevent rotation when attached and the keying feature on the first connecting section is different then the keying feature on the second connecting section;

one of the plurality of pole sections having a power source thereon and another one of the plurality of pole sections having a power tool thereon, wherein when the pole sections are attached, power from the power source is capable of being delivered to the power tool;

the plurality of pole sections comprise three pole sections, a first pole section having a power source, a second pole section having a male stem and a female opening on opposite ends thereof, and a third pole section having a power tool thereon; and wherein the keying feature of the first connecting section comprises the male stem having a generally circular shape with a flattened portion and the female opening has a corresponding shape, and the keying feature of the second connecting section has a male stem with a generally circular shape with two flattened portions and the female opening has a corresponding shape, wherein the first pole section may be attached to either the second pole section or the third pole section.

2. The power tool device of claim 1, wherein the keying feature further comprises a slot on the male stem and a corresponding projection on the female opening, where the projection is inserted into the slot to prevent rotation of the male stem relative to the female opening when attached.

3. The power tool device of claim 1, wherein the pole sections have a grip thereon made of a soft cushioning material.

4. The power tool device of claim 1 wherein the female opening has a cavity for holding a fastener that secures the female opening to the pole section.

5. An extension pole adapted to extend the reach of a power tool, the extension pole comprising:

at least three pole sections, each having an electrical conductor therein for transferring electrical power and capable of being attached to an adjacent pole section to electrically connect pole sections, the at least three pole sections comprising a first pole section adapted to have a handle and a power source thereon, a second pole section in between the first and a third pole section, and a third pole section adapted to have a power tool thereon;

a first connecting section joining the first and second pole section comprising a first male stem and a first female opening, the first male stem being shaped to fit in the first female opening and prevent rotation;

a second connecting section joining the second and third pole section comprising a second male stem and a second female opening, the second male stem being shaped to fit in the second female opening and prevent rotation;

wherein the first male stem is shaped differently than the second male stem such that the first pole section may be attached to either the second or third pole section; and wherein when the pole sections are attached, power from the power source is capable of being delivered to the power tool.

6. The extension pole of claim 5, wherein at least one of the male stems includes a slot along its longitudinal length, and at least one of the female openings includes a projection, and upon attachment of the male stem with the female opening, the projection is slid into the slot.

7. The extension pole of claim 5, wherein each male stem is adjacent a threaded portion and each female opening is surrounded by a threaded sleeve that engages the threaded portion of the male stem.

8. The extension pole of claim 5 wherein the pole sections have a grip thereon made of a soft cushioning material.

9. The extension pole of claim 5 wherein the female opening has a cavity for holding a fastener that secures the female opening to the pole section.

* * * * *